(12) United States Patent
Hong (10) Patent No.: US 7,982,801 B2
(45) Date of Patent: Jul. 19, 2011

(54) DEVICE AND METHOD FOR GENERATING VARIABLE SLICE REFERENCE LEVEL

(75) Inventor: Sang-min Hong, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1189 days.

(21) Appl. No.: 11/676,009

(22) Filed: Feb. 16, 2007

(65) Prior Publication Data

US 2008/0036910 A1    Feb. 14, 2008

(30) Foreign Application Priority Data

Feb. 28, 2006 (KR) .................. 10-2006-0019339

(51) Int. Cl.
*H04N 7/00* (2011.01)
(52) U.S. Cl. ........................... 348/465; 348/468
(58) Field of Classification Search .......... 348/461–468, 348/476, 478
See application file for complete search history.

(56) References Cited

U.S. PATENT DOCUMENTS 6,069,499 A * 5/2000 Cho et al. .................. 327/58
6,912,009 B2 * 6/2005 Orii ........................ 348/465

FOREIGN PATENT DOCUMENTS

| JP | 2002-271648 | 9/2002 |
| KR | 1998-014217 | 5/1998 |
| KR | 1999-0060496 | 11/2005 |

OTHER PUBLICATIONS

English Abstract for Publication No. 1998-014217.
English Abstract for Publication No. 2002-271648.
English Abstract for Publication No. 100531340 (for 1999-0060496).

* cited by examiner

*Primary Examiner* — M. Lee
(74) *Attorney, Agent, or Firm* — F. Chau & Associates, LLC (57) ABSTRACT

A device and a method for generating a variable slice reference level. At least two variable slice reference levels used for slicing VBI data are generated. The device includes a high/low average value generator, a reference value detector, and a slice level generator. The high/low average value generator generates an average high value and an average low value of the VBI data using a plurality of window signals. The reference value detector generates an average reference value of the VBI data using the window signals. The slice level generator outputs a high slice level and a low slice level using the average high value, the average low value, the average reference value, and a tuned factor.

29 Claims, 7 Drawing Sheets

DEVICE AND METHOD FOR GENERATING VARIABLE SLICE REFERENCE LEVEL

CROSS-REFERENCE TO RELATED PATENT APPLICATION

This application claims priority to Korean Patent Application No, 10-2006-0019339, filed on Feb. 28, 2006, in the Korean Intellectual Property Office, the disclosure of which is hereby incorporated by reference in its entirety.

BACKGROUND OF THE INVENTION

1. Technical Field

The present disclosure relates to generating a reference level, and more particularly, to a device for generating a variable slice reference level.

2. Discussion of Related Art

A conventional television set displays about 24 to 30 frames per second. According to the theory of persistence of vision, the human eye retains an image for a brief instant after it has disappeared. Interlaced television has been designed to make use of persistence of vision by not having to draw an entire image at once. For a conventional interlaced television, one frame is displayed in two scans, with the first scan drawing the odd lines of a screen and the second scan drawing the even lines of the screen. Here, one scan is called a field, and two scans including two fields are collectively called one frame.

Information stored in the field is displayed from an upper left corner to a lower right corner of the screen in a raster pattern. When the stored information in the current field is information pertaining to the odd lines of the screen, information stored in the next field is information pertaining to the even lines of the screen. The information stored in the next field is also displayed in the raster pattern from the upper left corner of the screen to the lower right corner of the screen.

In an apparatus performing a raster operation as described above, after a raster scan has finished traveling from the upper left corner of the screen to the lower right corner of the screen, the scanning beam must reset back to the upper left corner of the screen to begin the next scan. During the time interval when the location of the scanning beam changes, a signal cannot be displayed. This time interval is called a vertical blanking interval (VBI). For convenience of description, a time interval between frames will also be called the VBI.

Even though the conventional television set may not be able to display a signal during the VBI, the television set may continue to receive a broadcasting signal. The additional signal transmitted during the VBI may include various value added services such as a closed-caption television broadcasting, a teletext broadcasting service, a program code broadcasting service, and/or an interactive service using HTML can be provided. The additional data is added in the VBI region located in a middle portion of the continuous data stream to be transmitted.

Closed-caption television broadcasting originates from research conducted for the benefit of hearing-impaired people by the National Captioning Institute, which was founded by the United States Federal Government in 1979. Standard specifications for closed-caption television broadcasting and extended data services (EDS) were published as EIA-608 in April of 1993 by the Electronic Industries Alliance In a closed-caption broadcasting service provided in the U.S.A., the 21st line of the VBI and a clock frequency of 503 KHz are used for closed-caption broadcasting.

In the teletext broadcasting service, texts such as urgent news, weather information, stock information, and day-to-day information are coded into digital signals. The coded digital signals are input to the VBI region to be transmitted. The coded digital signals are decoded by a decoder of a viewer's television set and displayed on the television screen. Other than the text described above, the teletext broadcasting service can be applied to a field such as a caption broadcasting service for the hearing impaired or for displaying alternative-language subtitles, A program code broadcasting service provides information related to television programming and a reservation recording service. In the program code broadcasting service, information such as standard time information, daily and weekly program list information, and the like, is coded into a digital signal. The digital signal is then input to the VBI region of a broadcasting signal to be transmitted. Through the program code broadcasting service, a user can access services such as a reserved recording service for a video cassette recorder, a recording data service in the case of a power outage, an automatic setting and adjustment service of the current time, a classification of broadcasting programs according to types of programs, and the like.

An interactive service using hyper-text markup language (HTML) may be transmitted during the VBI. The interactive service includes an inter-cast, an inter-text, a bit-cast, a data-wave, and the like. The inter-cast, which is a compound word meaning internet and broadcast, is a service for adding and transmitting web data in an HTML format in a conventional broadcasting program. The web data is added to the VBI region of a television broadcasting signal and transmitted. A television broadcasting program and additional information in a web data format can be viewed simultaneously by a personal computer in which a receiving card for TV broadcasting is installed. When a user of a computer is connected to the Internet, it is possible for the user to navigate to a different web site linked by the web data received by the receiving card for TV broadcasting.

Figure 1:
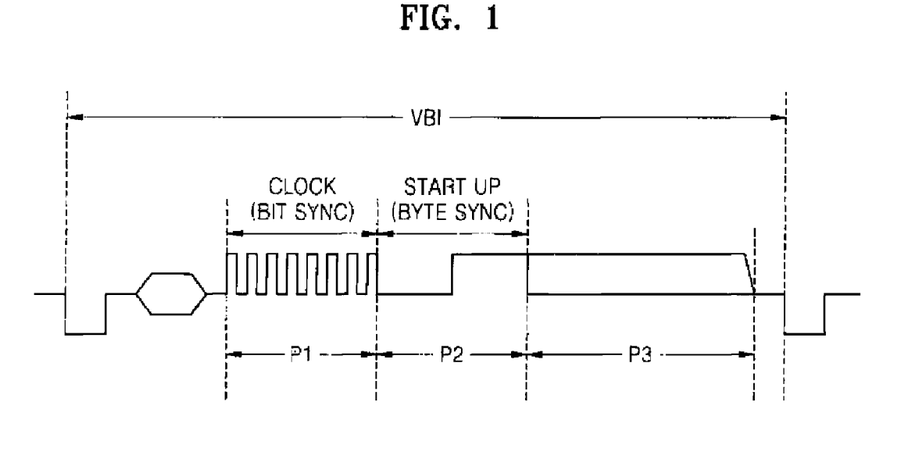
FIG. 1 is a diagram illustrating signals and data used in a vertical blanking interval (VBI) region.

FIG. 1 illustrates signals and data used in the VBI region

When closed-caption data for closed-caption television broadcasting is added in the VBI region of a television signal to be transmitted, the closed caption data is added to the 21st data line of a plurality of data lines included in the VBI region. The caption data is divided into a clock run-in interval P1, a start-up interval P2, and a caption data interval P3.

The frequency of a clock signal CLOCK of the clock run-in interval P1 is 503 kHz. A period of the start-up interval P2 is equivalent to eight times the period of a clock signal CLOCK. The associated start-up signal is synchronized with the associated clock run-in signal When a predetermined time elapses after the start-up signal is enabled, for example, at a beginning of the caption data interval P3, a logic value of the caption data is determined using a comparison reference signal having a predetermined voltage level. The voltage level of the comparison reference signal is referred to as a slice level.

A voltage difference of the caption data is about 0.7 V. Generally, the slice level is fixed to an arbitrary voltage level between a maximal voltage level and a minimal voltage level. Here, the phrase "performing a slice operation" indicates determining a logic value of the caption data by comparing a magnitude of the caption data to the slice level. For example, the caption data is determined to have a value of a logical high, when the magnitude of the caption data signal is greater than the slice level and the caption data is determined to have a value of a logical low when the magnitude of the caption data signal is equal to or less than the slice level.

In order to prevent a slice error from occurring in a case when a magnitude of a caption data signal changes due to a noise, a method of using an additional reference signal for the comparison has been proposed. However, since the two reference signals for the comparison have fixed voltage levels, it is difficult, to correctly slice the caption data when the caption data contains noise of various magnitudes.

When a teletext used in a teletext broadcasting service is input to the VBI region to be transmitted, the teletext can be divided into a bit sync interval P1, a byte sync interval P2, and a text-data interval P3, The byte sync interval P2 has a width of eight clock signals. A byte sync signal BYTE SYNC is synchronized with a bit sync signal BIT SYNC. When a predetermined time elapses after the byte sync signal is enabled, for example, at a beginning of the text-data interval P3, a logic value of the text-data is determined using a reference signal for comparison.

In the teletext broadcasting service, since the magnitude of the reference signal for the comparison, for example, a slice level, is fixed to a predetermined voltage level, it is difficult to correctly slice the caption data when the caption data contains noise of various magnitudes.

SUMMARY OF THE INVENTION

The present disclosure provides a device for generating at least two variable slice reference levels used for slicing vertical blanking interval (VBI) data.

The present disclosure also provides a method of generating at least two plurality of variable slice reference levels used for slicing the VBI data.

According to an exemplary embodiment of the present invention, a device for generating a variable slice reference level is provided. The device includes a high/low average value generator, a reference value detector, and a slice level generator. The high/low average value generator generates an average high value and an average low value of the VBI data using at least two window signals. The reference value detector generates an average reference value of the VBI data using the at least two window signals. The slice level generator outputs a high slice level and a low slice level using the average high value of the VBI data, the average low value of the VBI data, the average reference value of the VBI data, and a tuned factor.

According to another exemplary embodiment of the present invention, a method of generating two or more variable slice reference levels used for slicing VBI data is provided. The method included generating two or more variable slice reference levels used for slicing the VBI data, setting windows, detecting average values of the VBI data, and generating high and low slice levels of the VBI data.

The setting of windows sets at least two window intervals. The detecting of the average values detects an average reference value, an average high value, and an average low value. The generating of high and low slice levels generates high and low slice levels using the average reference value, the average high value, and the average low value.

BRIEF DESCRIPTION OF THE DRAWINGS

The above and/or other features and aspects of the present disclosure will become more apparent by describing in detail exemplary embodiments of the present invention with reference to the attached drawings in which.

DETAILED DESCRIPTION OF THE EXEMPLARY EMBODIMENTS

Exemplary embodiments of the present invention will now be described with reference to the accompanying drawings. Like reference numerals may denote like elements in the drawings.

Figure 2:
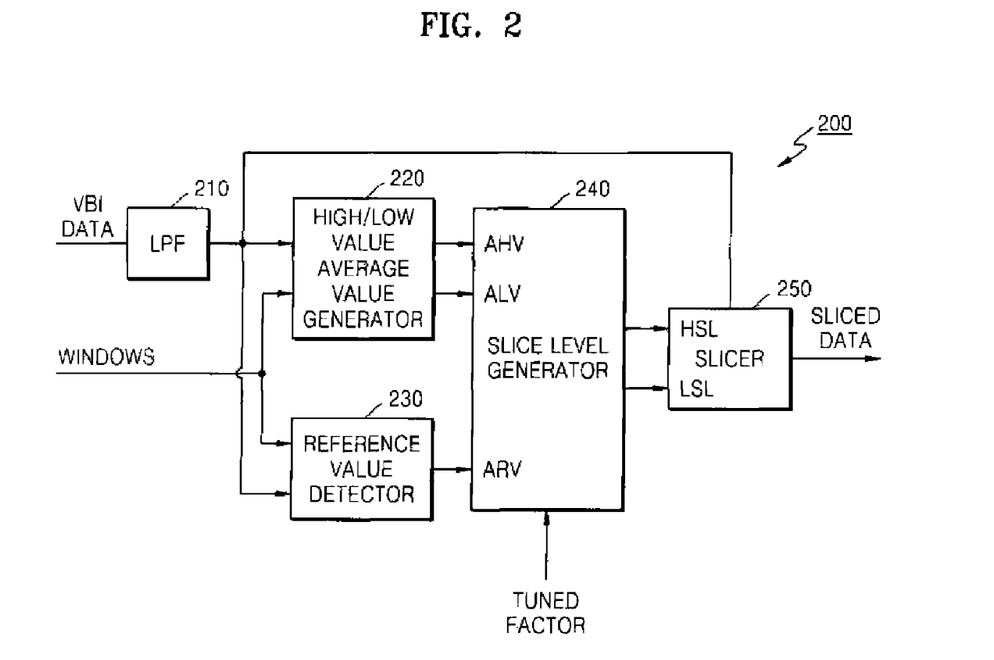
FIG. 2 illustrates a block diagram of a device for generating a variable slice reference level according to an exemplary embodiment of the present invention.

FIG. 2 illustrates a block diagram of a device for generating a variable slice reference level according to an exemplary embodiment of the present invention.

Referring to FIG. 2, a device 200 for generating a variable slice reference level includes a low-pass filter 210, a high/low average value generator 220, a reference value detector 230, a slice level generator 240, and a sheer 250.

The low-pass filter 210 removes low frequency noise included in a vertical blanking interval (VBI) signal VBI DATA which has been input to the VBI region and outputs the VBI signal VBI DATA from which noise has been removed. The high/low average value generator 220 generates an average high value signal AHV and an average low value signal ALV of the VBI signal VBI DATA using at least two window signals WINDOW. The reference value detector 230 generates an average reference value signal ARL of the VBI signal VBI DATA using at least window signals WINDOW.

The slice level generator 240 outputs a high slice level signal HSL and a low slice level signal LSL using the average high value signal AHV and the average low value signal ALV, the average reference value signal ARL, and a tuned factor TUNED FACTOR. The slicer 250 outputs the sliced VBI data signal SLICED DATA using the high and low slice levels signals HSL and LSL.

For convenience of description, the at least two window signals WINDOW are described below with reference to FIGS. 6 and 7.

Figure 6:
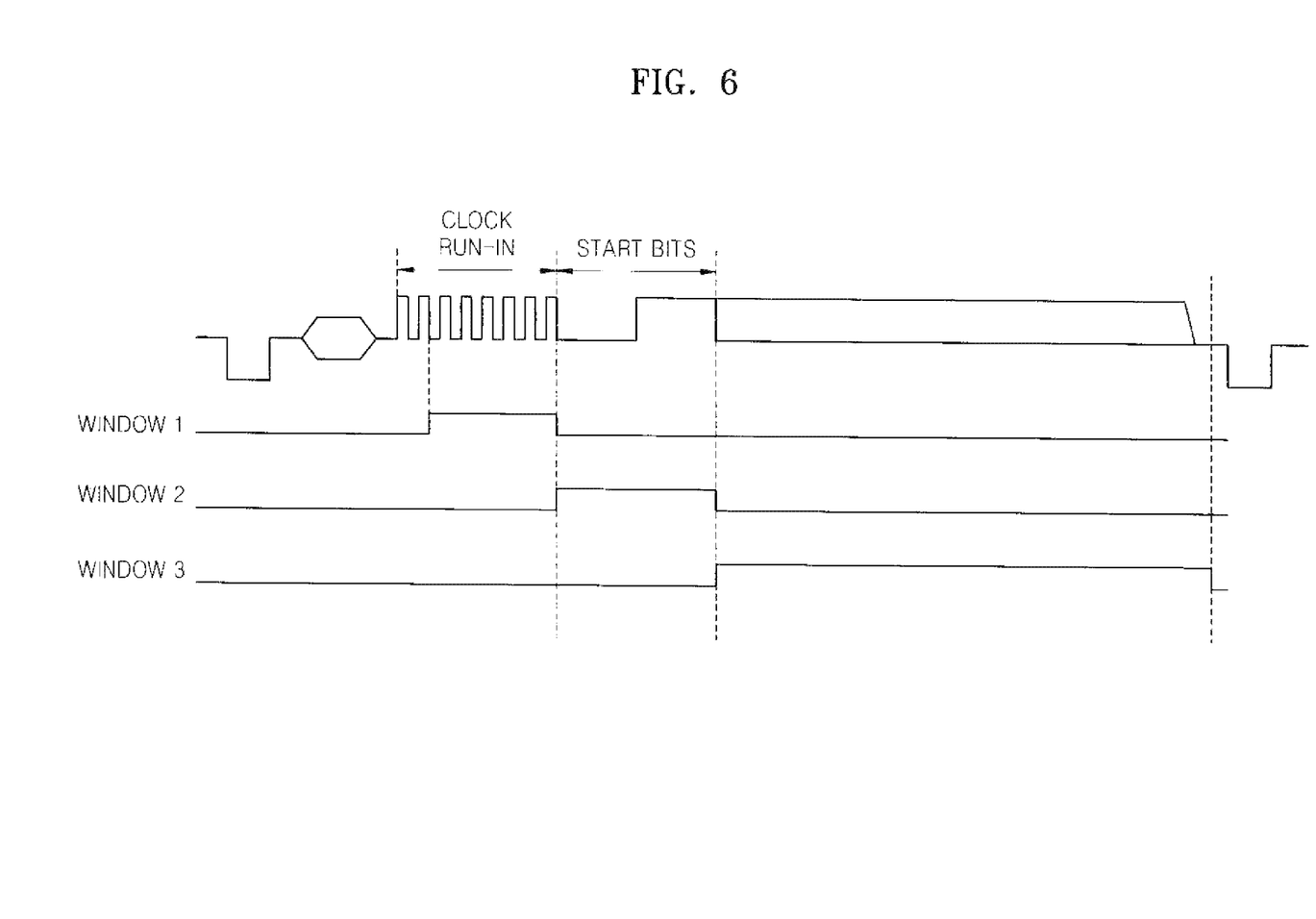
FIG. 6 illustrates a diagram of window signals used in closed-caption broadcasting according to an exemplary embodiment of the present invention.

FIG. 6 illustrates a diagram of the window signals WINDOW used in closed-caption broadcasting according to an exemplary embodiment of the present invention.

Referring to FIG. 6, the VBI signal VBI DATA may be closed-caption data used in TV closed-caption broadcasting. In this case, the VBI signal includes a clock run-in interval CLOCK RUN-IN, a start bit interval START BITS, and a data interval. The window signals include a first window signal WINDOW1 including the clock run-in interval CLOCK RUN-IN and a second window signal WINDOW2 including the start bit interval START BITS. The window signals WINDOW may further include a third window signal WINDOW3 including an interval in which data to be sliced is included. More specifically, the first window signal WINDOW1 may include the whole or part of the clock, run-in interval CLOCK RUN-IN The second window signal WINDOW2 includes a period equal to eight times the period of a clock signal of the clock run-in interval CLOCK RUN-IN.

Figure 7:
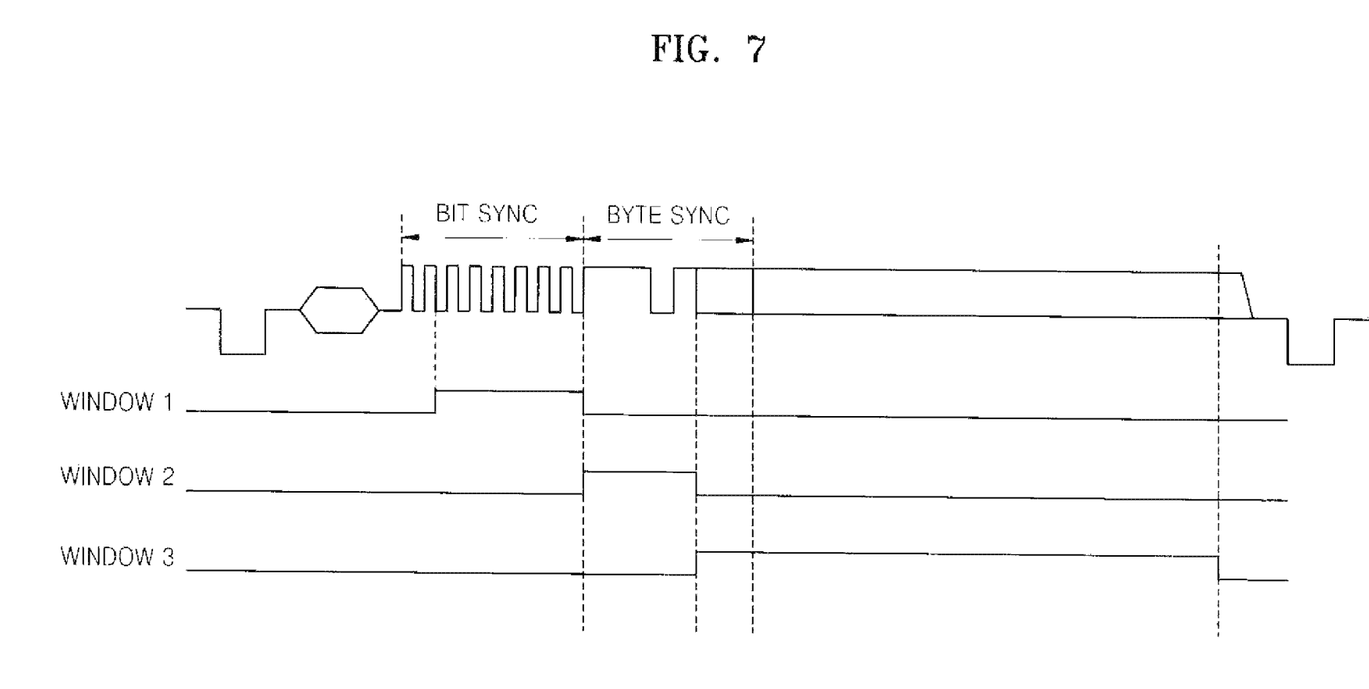
FIG. 7 illustrates a diagram the window signals used in a teletext broadcasting service, according to an exemplary embodiment of the present invention.

FIG. 7 illustrates a diagram of the window signals WINDOW used in a teletext broadcasting service according to an exemplary embodiment of the present invention.

Referring to FIG. 7, the VBI signal VBI DATA may be teletext data used in a teletext broadcasting service. In this case, the VBI signal includes a bit sync interval BIT SYNC, a byte sync interval BYTE SYNC, and a data interval. The window signals WINDOW as described above include a first window signal WINDOW1 including the bit sync interval BIT SYNC and a second window signal WINDOW2 including the byte sync interval BYTE SYNC. The window signals WINDOW may further include the third window signal WINDOW3 including an interval in which data to be sliced is included.

More specifically, the first, window signal WINDOW1 includes the whole or part of the bit sync interval BIT SYNC. The second window signal WINDOW2 includes a period equal to five times the period of a bit sync signal of the bit sync interval BIT SYNC.

Figure 3:
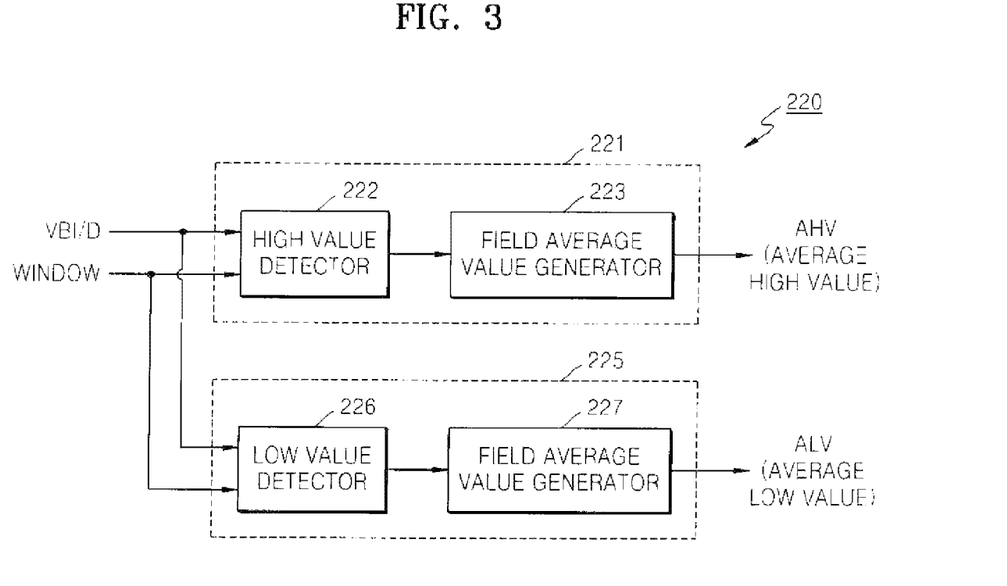
FIG. 3 illustrates a diagram of a high/low average value generator of the device illustrated in FIG. 2, according to an exemplary embodiment of the present invention.

FIG. 3 illustrates a diagram of the high/low average value generator illustrated in FIG. 2, according to an exemplary embodiment of the present invention.

Referring to FIG. 3. the high/low average value generator 220 includes an average high value generator 221 and an average low value generator 225.

The average high value generator 221 generates an average high value signal AHV using the at least two window signals WINDOW and the VBI data VBI/D. The average high value generator 221 includes a high value detector 222 detecting high values of the VBI data VBI/D while the window signals WINDOW are activated and a field average value generator 223 which generates averages of the detected high values of the VBI data VBI/D field by field and outputs the average high value signal AHV.

The average low value generator 225 generates an average low value ALV using the at least two window signals WINDOW and the VBI data VBI/D. The average low value generator 225 includes a low value detector 226 detecting low values of the VBI data VBI/D while the window signals WINDOW are activated and a field average value generator 227 which generates an average of the detected low values of the VBI data VBI/D field by field and outputs the average low value signal ALV.

The reference value detector 230, illustrated in FIG. 2, detects an average reference value signal ARL that satisfies Equation 1 as follows.

[Equation 1]

$$ARL = WF_1 \times S_1 + WF_2 \times S_2$$

wherein ARL is an average reference value signal, $WF_1$ is a first weight factor, $S_1$ is the average magnitude of the signals included in the first window signal, $WF_2$ is a second weight factor, and $S_2$ is an average magnitude of the signals included in the second window signal.

Here, the values of the two weight factors $WF_1$ and $WF_2$ are different depending on whether the VBI data VBI/D is used for the closed-caption data or the teletext service. When the VBI data VBI/D is used for the closed-caption data of TV closed-caption broadcasting, the first weight factor $WF_1$ is 0.5, and the second weight, factor $WF_2$ is 0.75. On the other hand, when the VBI data VBI/D is the teletext service used in teletext broadcasting, the first weight factor $WF_1$ is 0.5, and the second weight factor $WF_2$ is 0.375. The weight factors may be determined by experimentation.

Figure 4:
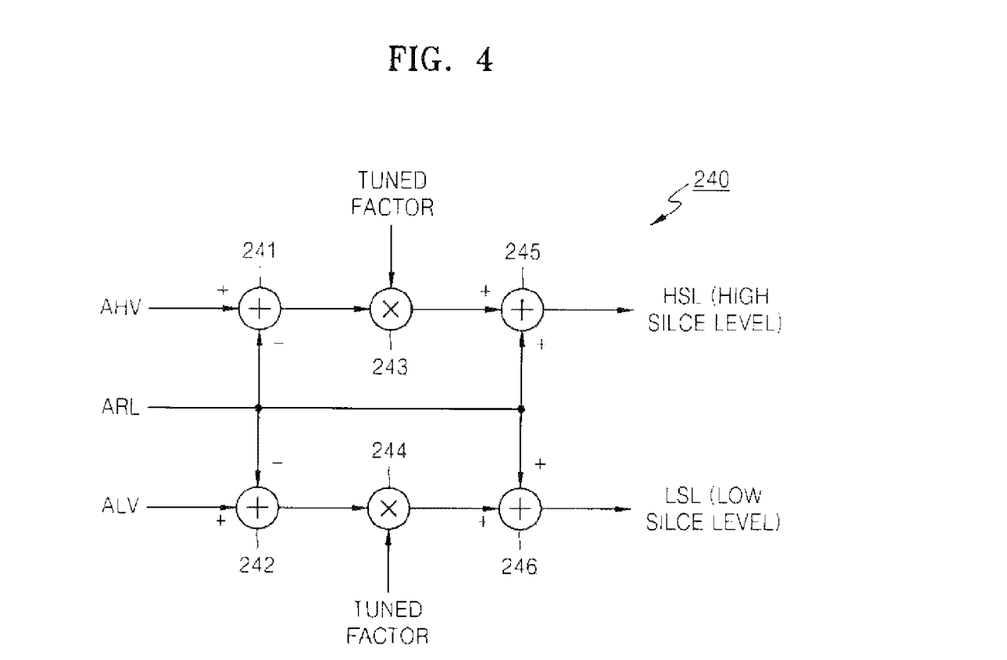
FIG. 4 illustrates a circuit diagram of a device for generating a variable slice reference level illustrated in FIG. 2, according to an exemplary embodiment of the present invention.

FIG. 4 is a circuit diagram of the slice level generator 240 illustrated in FIG. 2.

Referring to FIG 4, the slice level generator 240 includes four adders 241, 242, 245, 246 and two multipliers 243 and 244.

The first adder 241 adds the average high value AHV and the average reference value ARL. The second adder 242 adds the average low value ALV and the average reference value ARL. The first multiplier 243 multiplies an output of the first adder 241 by the tuned factor TUNED FACTOR. The second multiplier 244 multiplies an output of the second adder 242 by the tuned factor TUNED FACTOR. The third adder 245 adds an output of the first multiplier 243 and the average reference value ARE to output a high slice level HSL. The fourth adder 246 adds an output of the second multiplier 244 and the average reference value ARE to output a low slice level LSL.

The tuned factor TUNED FACTOR is a value used for adjusting the high and low slice levels HSL and LSL. The tuned factor TUNED FACTOR has a value less than one.

Figure 5:
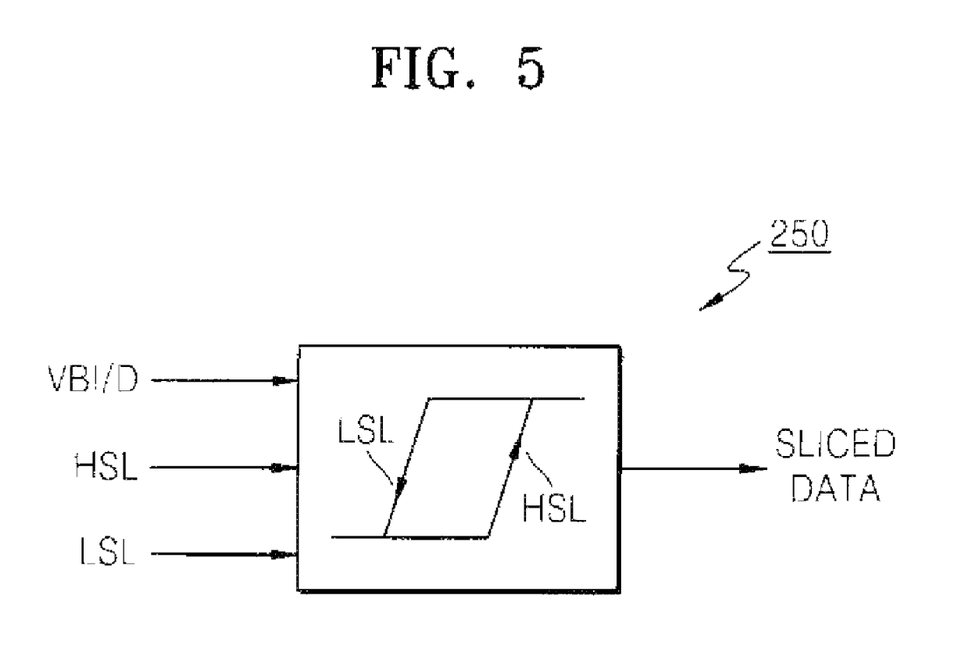
FIG. 5 is a diagram illustrating an electrical characteristic of a sheer of the device illustrated in FIG. 2, according to an exemplary embodiment of the present invention.

FIG. 5 is a diagram illustrating an electrical characteristic of the sheer 250 illustrated in FIG. 2 according to an exemplary embodiment of the present invention.

Referring to FIG. 5, the sheer 250 slices the VBI data VBI/D by applying the high and low slice level signals HSL and LSL to a hysteresis curve. For example, the high slice level signal HSL is set to a value corresponding to a predetermined value in an increasing portion of the hysteresis curve and the low slice level signal LSL is set to a value corresponding to a predetermined value in a decreasing portion of the hysteresis curve.

When the magnitude of the VBI signal VBI DATA, is less than the low slice level LSL indicating that the magnitude of the VBI data VBI/D is located in the decreasing portion of the hysteresis curve, the VBI data VBI/D is sliced into a logic low value. On the other hand, when the magnitude of the VBI data VBI/D is greater than the high slice level HSL indicating that the magnitude of the VBI data VBI/D is located in the increasing portion of the hysteresis curve, the VBI signal VBI DATA is sliced into a logic high value.

When the magnitude of the VBI data VBI/D is between the high and low slice levels HSL and LSL, the VBI data VBI/D is sliced to the logic high value or the logic low value according to a corresponding location on the hysteresis curve. For example, in a case where the magnitude of the VBI data VBI/D is between the high and low slice levels HSL and LSL, the VBI data VBI/D is sliced to the logic high value when the magnitude of VBI data VBI/D is located in a left-handed decreasing portion of the hysteresis curve and the VBI data VBI/D is sliced to the logic low value when the magnitude of the VBI data VBI/D is located in a right-handed increasing portion of the hysteresis curve.

Operations of a device for generating a variable slice reference level according to an exemplary embodiment of the present invention are described below with reference to FIGS. 2 to 6.

According to an exemplary embodiment of the present invention, the two slice levels used to compare the magnitudes of the input VBI data VBI/D change according to the magnitudes of the VBI data VBI/D, rather than being fixed.

To change the slice levels, the VBI data VBI/D is measured. The average reference value ARV of VBI data VBI/D, the average high value AHV of the VBI data VBI/D and the average low value ALV of the VBI data VBI/D are measured. This occurs while the two window signals WINDOW1 and WINDOW2 are activated and are used to calculate and generate two slice level signals HSL and LSL which change according to the magnitude of the VBI data VBI/D for slicing.

The changed magnitudes of the VBI data VBI/D due to noise components are predicted to be the same as the average in a VBI data stream included in the same frame. Accordingly, the changed magnitudes of the VBI data VBI/D measured while of the two window signals WINDOW1 and WINDOW2 are activated, as described above, can be applied to the VBI data VBI/D in the frame. At this time, more precise values of the two slice levels HSL and LSL, which are changing accordingly, can be determined by further considering the tuning factor TURNING FACTOR.

Figure 8:
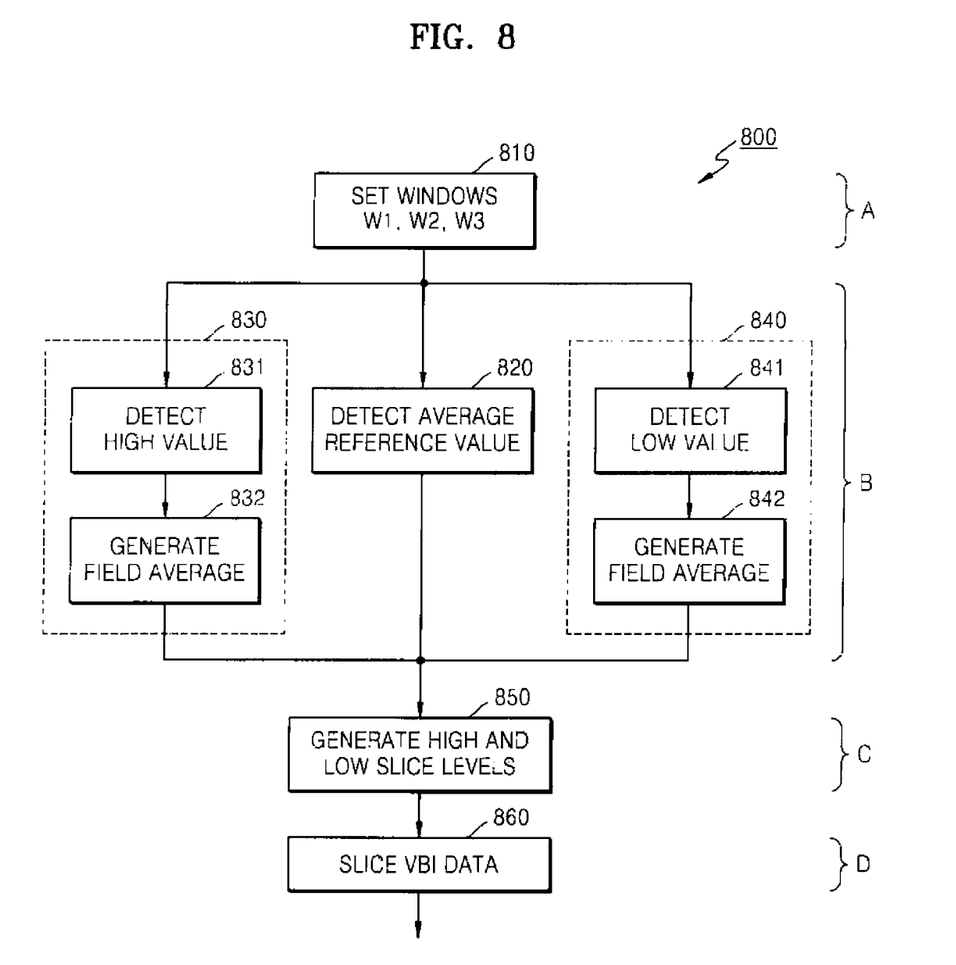
FIG. 8 illustrates a flowchart of a method of generating variable slice reference levels according to an exemplary embodiment of the present invention.

FIG. 8 illustrates a flowchart of a method of generating variable slice reference levels according to another exemplary embodiment of the present invention.

Referring to FIG. 8, the method 800 of generating variable slice reference levels generates at least two variable slice reference levels used to slice VBI data. The method 800 of generating variable slice reference levels includes setting at least two window signals (operation A), detecting the average values of the values (operation B), generating high and low slice levels (operation C), and slicing VBI data (operation D).

In operation A, at least two window intervals of the window signals are set.

When the VBI data is closed-caption data, used in TV closed-caption broadcasting, the VBI data, includes a clock run-in interval, a start bit interval, and a data interval. The window signals W1, W2, and W3 include a first window signal W1 including the clock run-in interval, a second window signal W2 including the start bit interval, and a third window signal W3 including an interval in which data to be sliced is included.

On the other hand, when the VBI data is teletext data used in a teletext broadcasting service, the VBI data includes a bit sync interval, a byte sync interval, and a data interval. The window signals W1, W2, and W3 described above include the first window signal W1 including the bit sync interval, and the second window signal W2 including the byte sync interval.

More specifically, the first window signal W1 includes the whole or part of the clock run-in interval or the bit sync interval.

The second window signal W2 includes a period equal to eight times the period of a clock signal of the clock run-in interval or a period equal to five times the period of a bit sync signal of the bit sync interval.

Operation B detects an average reference value, an average high value, and an average low value of the VBI data using the at least two window signals. Operation B includes detecting the average reference value (operation 820), detecting the average high value (operation 830), and detecting the average low value (operation 840).

Operation 820 detects the average reference value, which is an average value of the reference values of the VBI data, using the window signals W1, W2, and W3. The average reference value satisfies Equation 1 described above. The two weight factors in Equation 1 are determined as described below. When the VBI data is closed-caption data of TV closed-caption broadcasting, the first weight factor $WF_1$ is 0.5, and the second weight factor $WF_2$ is 0.75. On the other hand, when the VBI data is teletext data used in a teletext broadcasting service, the first weight factor $WF_1$ is 0.5, and the second weight factor $WF_2$ is 0.375.

Operation 830 detects the average high value, which is an average of the high values of the VBI data, using the window signals W1, W2, and W3. Operation 830 includes detecting high values of the VBI data while the window signals W1 and W2 are activated (operation 831) and generating a field average high value by calculating an average of the high values of the detected VBI data field by field (operation 832).

Operation 840 detects the average low value, which is an average of the low values of the VBI data, using the window signals W1, W2, and W3. Operation 840 includes detecting low values of the VBI data while the window signals W1, W2, and W3 are activated (operation 841) and generating a field average low value by calculating an average of the low values of the detected VBI data field by field (operation 842).

Operation C generates high and low slice values using the average reference value, the average high value, and the average low value (operation 850).

Figure 9:
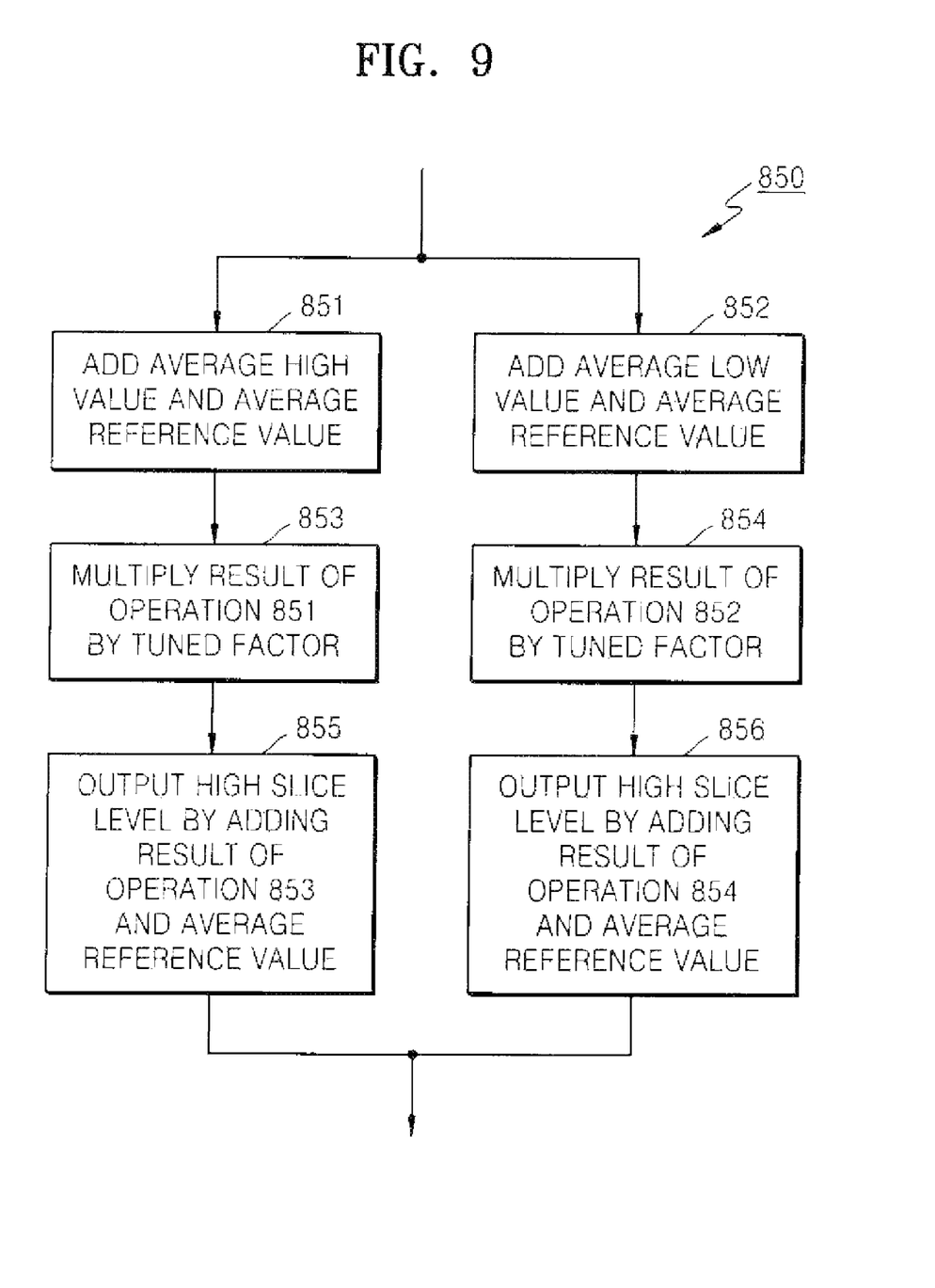
FIG. 9 illustrates a detailed block diagram of an operation of the method of generating high and low slice levels illustrated in FIG. 8, according to an exemplary embodiment of the present invention.

FIG. 9 illustrates a detailed block diagram of operation C illustrated in FIG. 8.

Referring to FIG. 9, generating the high and low slice levels (operation 850) includes adding the average high value AHV and the average reference value ARL (operation 851); adding the average low value ALV and the average reference value ARL (operation 852); multiplying a result of operation 851 by the tuned factor TUNED FACTOR (operation 853); multiplying a result of operation 852 by the tuned factor TUNED FACTOR, (operation 854); outputting the high slice level by adding a result of the operation 853 and the average reference value ARL (operation 855); and outputting the low slice level by adding a result of operation 854 and the average reference value ARL (operation 856).

Here, the tuned factor TUNED FACTOR is a value used for adjusting the magnitudes of the high and low slice levels. The tuned factor has a value less than one.

Operation D slices the VBI data using the high and low slice levels and a characteristic of a hysteresis curve (operation 860).

The high slice level is set to a value corresponding to a predetermined point in an increasing portion of the hysteresis curve and the low slice level is set to a value corresponding to a predetermined point in a decreasing portion of the hysteresis curve. When the magnitude of the VBI data is less than the low slice level indicating that the magnitude of the VBI data is located in the decreasing portion of the hysteresis curve, the VBI data is sliced into a logic low value. On the other hand, when the magnitude of the VBI data is larger than the high slice level indicating that the magnitude of the VBI data is located in the increasing portion of the hysteresis curve, the VBI data is sliced into a logic high value.

When the magnitude of the VBI data is between the high and low slice levels, the VBI data is sliced to the logic high value or the logic low value according the characteristics of the hysteresis curve.

As described above, in the device for generating a variable slice reference level and the method of generating variable slice reference levels, slice levels which change according to magnitudes of the VBI data are generated. The VBI data is sliced using the slice levels. Accordingly, it is possible to correctly slice the VBI data when the magnitudes of the VBI data change due to noise.

While exemplary embodiments of the present invention have been particularly shown and described with reference to the figures, it will be understood by those skilled in the art that various changes in form and details may be made therein without departing from the spirit and scope of the present invention.

What is claimed is:

1. A device for generating a variable slice reference level, the device comprising:
   an average high/low value generator generating an average high value and an average low value of VBI (vertical blanking interval) data using at least two window signals;
   a reference value detector generating an average reference value of the VBI data using the window signals; and
   a slice level generator generating a high slice level and a low slice level using the average high value, the average low value, the average reference value, and a tuned factor.

2. The device of claim 1,
   wherein, when the VB1 data is closed-caption data used in television closed-caption broadcasting comprising a clock run-in interval, a start bit interval, and a data interval, the at least two window signals comprise:
   a first window signal including the clock run-in interval; and
   a second window signal including the start bit interval, and
   wherein, when the VB1 data is teletext data used in a teletext broadcasting service comprising a bit sync interval, a byte sync interval, and the data interval, the window signals comprise:
   the first window signal including the bit sync interval; and
   the second window signal including the byte sync interval.

3. The device of claim 2,
   wherein, the first window signal includes a part of the clock run-in interval or the bit sync interval, and
   wherein the second window signal has a period equal to eight times a period of a clock signal of the clock run-in interval or a period equal to five times a period of a bit sync signal of the bit sync interval.

4. The device of claim 2, wherein the at least two window signals further comprise a third window signal having an interval comprising data to be sliced.

5. The device of claim 3, wherein the average reference value is equal to a first weight factor multiplied by an average magnitude of signals included in the first window signal interval plus a second weight factor multiplied by an average magnitude of signals included in the second window signal interval.

6. The device of claim 5,
   wherein, when the VBI data is closed-caption data of television closed-caption broadcasting, the first weight factor is 0.5 and the second weight factor is 0.75, and
   wherein, when the VBI data is teletext data used for a teletext broadcasting service, the first weight factor is 0.5 and the second weight factor is 0.375.

7. The device of claim 1, wherein the average high/low value generator comprises:
   an average high value generator generating the average high value using the at least two window signals and the VBI data; and
   an average low value generator generating the average low value using the at least two window signals and the VBI data.

8. The device of claim 7, wherein the average high/low value generator additionally comprises:
   a high value detector detecting high values of the VBI data while the at least two window signals are activated; and
   a field average value generator generating average values of the detected high values of the VBI data, field by field, and outputting the average high values.

9. The device of claim 7, wherein the average high/low value generator additionally comprises:
   a low value detector detecting the low values of the VBI data while of the at least two window signals are activated; and
   a field average value generator generating average values of the detected low values of the VBI data, field by field, and outputting the average low values.

10. The device of claim 1, wherein the slice level generator comprises:
    a first adder adding the average high value and the average reference value;
    a second adder adding the average low value and the average reference value;
    a first multiplier multiplying an output of the first adder by the tuned factor;
    a second multiplier multiplying an output of the second adder by the tuned factor;
    a third adder adding an output of the first multiplier and the average reference value and outputting the high slice level; and
    a fourth adder adding an output of the second multiplier and the average reference value and outputting the low slice level.

11. The device of claim 10, wherein the tuned factor is a value of less than one used for adjusting the high and low slice levels.

12. The device of claim 1, further comprising a low-pass filter removing low frequency noise from the VBI data which has been input to a VBI region.

13. The device of claim 1, further comprising a slicer slicing the VBI data using the high slice level and the low slice level.

14. The device of claim 13,
    wherein the slicer slices the VBI data by applying the high slice level and the low slice level are applied to a hysteresis curve, and
    wherein the high slice level is set to a value corresponding to a predetermined point in an increasing portion of the hysteresis curve, and the low slice level is set to a value corresponding to a predetermined point in a decreasing portion of the hysteresis curve.

15. The device of claim 14,
    wherein the VBI data is sliced to a logic low when the VBI data is less than the low slice level based on a result that a magnitude of the VBI data is located in the decreasing portion of the hysteresis curve,
    wherein the VBI data is sliced to a logic high when the VBI data is greater than the low slice level based on a result that a magnitude of the VBI data is located in the increasing portion of the hysteresis curve, and
    wherein the VBI data is sliced to the logic high or the logic low based on characteristics of the hysteresis curve when the magnitude of the VBI data is between the high slice level and the low slice level.

16. A method of generating at least two variable slice reference levels for slicing VBI (vertical blanking interval) data, the method comprising:
    setting at least two window intervals;
    detecting an average reference value, an average high value, and an average low value of the VBI data using the at least two window intervals; and generating a high slice level and a low slice level using the average reference value, the average high value, and the average low value.

17. The method of claim 16,
wherein, when the VBI data is closed-caption data used in television closed-caption broadcasting comprising a clock run-in interval, a start bit interval, and a data interval, the at least two window intervals comprise:
a first window interval including the clock run-in interval; and
a second window interval including the start bit interval, and
wherein, when the VBI data is teletext data used in a teletext broadcasting service comprising a bit sync interval, a byte sync interval, and a data interval, the at least two window intervals comprise:
the first window signal including the bit sync interval; and
the second window signal including the byte sync interval.

18. The method of claim 17,
wherein the first window interval includes a part of the clock run-in interval or the bit sync interval, and
wherein the second window interval has a period equal to eight times a period of a clock signal of the clock run-in interval or a period equal to five times a period of a bit sync signal of the bit sync interval.

19. The method of claim 17, wherein the window interval further comprise a third window interval including an interval in which data to be sliced is included.

20. The method of claim 16, wherein the detecting of the average reference value, the average high value and the average low value comprises:
detecting an average high value as an average value of the high values of the VBI data, using the at least two window intervals;
detecting an average low value as an average value of the low values of the VBI data, using the at least two window intervals; and
detecting an average reference value as an average value of the reference values of the VBI data using the at least two window intervals.

21. The method of claim 20, wherein the average reference value is equal to a first weight factor multiplied by an average magnitude of the signals included in the first window interval plus a second weight factor multiplied by an average magnitude of the signals included in the second window interval.

22. The method of claim 21,
wherein, when the VBI data is closed-caption data of television closed-caption broadcasting, the first weight factor is 0.5 and the second weight factor is 0.75, and
wherein, when the VBI data is teletext'data used for a teletext broadcasting, the first weight factor is 0.5 and the second weight factor is 0.375.

23. The method of claim 20, wherein the detecting of the average high value comprises:
detecting high values of the VBI data while the at least two window intervals are activated; and
generating an average of the detected high values of the VBI data, field by field, as the average high value.

24. The method of claim 20, wherein the detecting of the average low value comprises:
detecting low values of the VBI data while the at least two window intervals are activated; and
generating an average of the detected low values of the VBI data, field by field, as the average low value.

25. The method of claim 20, wherein the generating of the high slice level and the low slice level comprises:
adding the average high value and the average reference value;
adding the average low value and the average reference value;
multiplying a result of the addition of the average high value and the average reference value by a tuned factor;
multiplying a result of the addition of the average low value and the average reference value by the tuned factor;
adding a result of the multiplication result of the addition of the average high value and the average reference value by the tuned factor with the average reference value and outputting the high slice level; and
adding a result of the multiplication of the result of the addition of the average low value and the average reference value by the tuned factor with the average reference value and outputting the low slice level.

26. The method of claim 20, wherein a tuned factor is a value, which is less than one, used for adjusting the high and low slice levels.

27. The method of claim 16, further comprising slicing the VBI data using the high slice level and the low slice level.

28. The method of claim 27,
wherein the slicing of the VBI data slices the VBI data by applying the high slice level and the low slice lever to a hysteresis curve, and
wherein the high slice level is set to a value corresponding to a predetermined point in an increasing portion of the hysteresis curve, and the low slice level is set to a value corresponding to a predetermined point in a decreasing portion of the hysteresis curve.

29. The method of claim 28,
wherein the VBI data is sliced to a logic low when the VBI data is less than the low slice level based on a result that a magnitude of the VBI data is located in the decreasing portion of the hysteresis curve,
wherein the VBI data is sliced to a logic high when the VBI data is greater than the low slice level based on a result that a magnitude of the VBI data is located in the increasing portion of the hysteresis curve, and
wherein the VBI data is sliced to the logic high or the logic low based on the characteristics of the hysteresis curve when the magnitude of the VBI data is between the high slice level and the low slice level.

* * * * *